UNITED STATES PATENT OFFICE.

JAMES M. F. HALL, OF DAVENPORT, IOWA.

IMPROVED MEDICAL COMPOUND.

Specification forming part of Letters Patent No. 58,249, dated September 25, 1866

*To all whom it may concern:*

Be it known that I, JAMES M. F. HALL, of Davenport, in the county of Scott and State of Iowa, have invented a new and useful Composition or Compound for the cure of diseases which human flesh is heir to; and I do hereby declare that the following is a full and exact description thereof.

The nature of my invention consists of a medicine (Hall's Health Panacea) prepared and composed of genus *Ceanothus*, or red-root, and cider vinegar, which is proportioned and prepared by taking two (2) pounds of red-root to one (1) gallon of vinegar, and boiling the same together in a porcelain kettle until reduced to one-third of a gallon.

What I claim as my invention, and desire to secure by Letters Patent, is—

The composition or compound as above prepared and described, and to be used as a medicine, as herein set forth.

JAMES M. F. HALL.

Witnesses:
J. C. TEAGARDEN,
JOHN C. BELL.